(12) United States Patent
Kashiwagi et al.

(10) Patent No.: US 6,871,974 B2
(45) Date of Patent: Mar. 29, 2005

(54) LIGHTING UNIT AND LIQUID CRYSTAL DEVICE USING THE SAME

(75) Inventors: Takafumi Kashiwagi, Takatsuki (JP); Yasuhiro Katou, Nomi-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/607,579

(22) Filed: Jun. 27, 2003

(65) Prior Publication Data

US 2004/0264162 A1 Dec. 30, 2004

(51) Int. Cl.$^7$ .............................................. G01D 11/28

(52) U.S. Cl. ........................ 362/26; 362/31; 362/330; 362/558

(58) Field of Search ........................... 362/26, 31, 330, 362/558, 561; 349/65

(56) References Cited

U.S. PATENT DOCUMENTS 6,607,281 B2 * 8/2003 Ono et al. .................... 362/31

* cited by examiner

*Primary Examiner*—Sandra O'Shea
*Assistant Examiner*—Mark Tsidulko
(74) *Attorney, Agent, or Firm*—McDermott Will & Emery LLP

(57) ABSTRACT

A lighting unit has a light guiding plate having a plurality of corner portions each of which is formed by intersecting adjacent two side surfaces. The side surface between a pair of the corner portions of the light guiding plate forms a light incident face Non-light-emitting portions of a light source correspond to the pair of the corner portions of the light guiding plate, and at least one of the corner portions has an inclined face in contact with the light incident face, the side surface adjacent to the light incident face, and at least one of the top surface and bottom surface, and inclined by an angle θ (90°<θ<180°) with respect to the top surface or the bottom surface.

5 Claims, 13 Drawing Sheets c perspective view d perspective view e perspective view f perspective view g perspective view

LIGHTING UNIT AND LIQUID CRYSTAL DEVICE USING THE SAME

BACKGROUND OF THE INVENTION

1. Field of the Invention

The present invention relates to a lighting unit for use in a liquid crystal display device or the like and to a liquid crystal display device using the same.

2. Description of the Related Art

FIG. 11 is a perspective view schematically showing a constitution of main parts of a conventional lighting unit for use in a liquid crystal display device. FIGS. 12 and 13 are explanatory views showing a lighting operation of the lighting unit of FIG. 11, in which FIG. 12 is a sectional view schematically showing the lighting unit and FIG. 13 is a top view showing the lighting unit. As shown in FIGS. 11 to 13, the lighting unit includes a bar-shaped light source 1, a light guiding plate 2 disposed such that the bar-shaped light source 1 is located close to a side surface 2A of the light guiding plate 2, a reflection sheet 4 disposed so as to cover at least a bottom surface 2B of the light guiding plate 2 where scattering patterns 3 (FIG. 12) are formed, and a diffusion sheet 5 disposed along a light emanating surface 2C of the light guiding plate 2. For the purpose of improving luminance as seen from front, such a constitution that a prism sheet having a light converging function is further disposed on a top face of the diffusion sheet 5 is also generally practiced.

As shown in FIG. 12, in the lighting unit, light emitted from the bar-shaped light source 1 is incident on the light guiding plate 2 from the side surface 2A (hereinafter, this face is referred to as a light incident face 2A) of the light guiding plate 2. While traveling inside the light guiding plate 2, the light is scattered by the scattering patterns 3 of the light guiding plate 2 and reflected by the reflection sheet 4 (not shown) appropriately. Then, the light emanates upwardly through the light emanating surface 2C of the light guiding plate 2. Further, this emanating light is diffused by the diffusing sheet 5 (not shown).

As the bar-shaped light source 1, a cold-cathode fluorescent light tube is generally used in the above-described lighting unit, while a hot-cathode fluorescent light tube is used in some large-size lighting units. As shown in FIG. 12, when either one of the fluorescent light tubes is used as the bar-shaped light source 1, electrodes 15 that do not emit light by themselves are respectively disposed at both ends of the bar-shaped light source 1. Therefore, in the bar-shaped light source 1, non-light-emitting portions 1B are respectively formed at both ends of the bar-shaped light source 1, and a light-emitting region (hereinafter, referred to as an effective light-emitting region) 1A is formed in a center portion (a portion of a glass tube 16) sandwiched between the non-light-emitting portions 1B.

In the bar-shaped light source 1, because the non-light-emitting portions 1B are formed at both ends of the bar-shaped light source 1, the effective light-emitting region 1A is shorter in length than the overall length of the bar-shaped light source 1. Furthermore, owing to the non-light-emitting portions 1B formed at both ends of the bar-shaped light source 1, the amount of incident light at both ends of the light incident face 2A is reduced, thereby causing two corner portions X of the light guiding plate 2 that are opposite to the non-light-emitting portions 1B of the bar-shaped light source 1 to be darkened. As a result, as shown in FIG. 13, the luminance of light emanating from the light emanating surface 2C of the light guiding plate 2 becomes low at the corner portions X. As used herein, the corner portion X refers to a portion where the light incident face 2A and a side surface 2D adjacent to the light incident face 2A intersect.

In the light guiding plate 2, as described above, its luminance is reduced at the corner portions X, thereby resulting in non-uniform luminance over the entire light emanating surface 2C of the light guiding plate 2. Although boundaries between darkened portions (hereinafter, referred to as dark portions) 10 of the corner portions X, and the remaining bright portion do not appear clearly, in a plan view, the boundaries appear to be inclined so as to extend outwardly from both ends of the effective light-emitting region 1A as a whole (the dark portions 10 in FIG. 13 is schematically shown).

In order to solve the above problem, there is an approach in which the overall length of the bar-shaped light source 1 is extended so that the effective light-emitting region 1A reaches both ends of the light incident face 2A of the light guiding plate 2. However, in this constitution, since the non-light-emitting portion 1B of the bar-shaped light source 1 protrudes from the light guiding plate 2, the overall length of the bar-shaped light source1 is lengthened, causing the size of the entire lighting unit to be increased. As a result, narrowing of a display panel frame, which is required in the liquid crystal display device, is not achieved.

SUMMARY OF THE INVENTION

The present invention is made to solve the above problem, and an object of the present invention is to provide a lighting unit in which even when non-light-emitting portions of a light source are disposed respectively at end portions of a light incident face of a light guiding plate, corner portions of the light guiding plate that are located close to the non-light-emitting portions are not darkened, so that uniformity of the luminance over the entire top surface of the light guiding plate can be achieved, and a liquid crystal display device in which narrowing of a display panel frame and uniform luminance can be achieved using the lighting unit.

In order to achieve the above object, according to the present invention, there is provided a lighting unit comprising: a light guiding plate having a top surface and a bottom surface as a pair of principal surfaces, a plurality of side surfaces formed on outer peripheries of the principal surfaces, and a plurality of corner portions each of which is formed by intersecting adjacent two side surfaces of the plurality of side surfaces, the side surface between a pair of the corner portions forming a light incident face; and a light source provided along the light incident face of the light guiding plate, the light source having both end portions forming non-light-emitting portions and a portion between the both end portions forming a light-emitting portion, respectively, in which light emitted from the light source and incident on the light incident face of the light guiding plate emanates from the top surface of the light guiding plate, wherein the light source is disposed such that the non-light-emitting portions correspond to the pair of the corner portions, respectively, and at least one of the pair of corner portions of the light guiding plate has an inclined face in contact with the light incident face, the side surface adjacent to the light incident face, and at least one of the top surface and bottom surface, and inclined by an angle θ with respect to the top surface or the bottom surface, a is larger than 90 degrees and smaller than 180 degrees.

With this constitution, since light incident on the inclined face from the light source is reflected there, the luminance at the corner portion having the inclined face is improved, thereby eliminating the dark portions on the top surface.

The inclined face of the light guiding plate may have a light scattering structure for scattering light incident on the inclined face. In this constitution, light incident on the inclined face from an inside of the light guiding plate in addition to the light source is scattered by the light scattering structure, thereby effectively increasing the luminance at the corner portion having the inclined face.

The inclined face of the light guiding plate may be in contact with the top surface of the light guiding plate. In this constitution, the corner portion having the inclined fac has a shape formed by cutting out a predetermined region from a region on the top surface side of the corner portion.

The inclined face of the light guiding plate may be in contact with the bottom surface of the light guiding plate. In this constitution, the corner portion having the inclined face has a shape formed by cutting out a predetermined region from a region on the bottom surface side of the corner portion.

The inclined face of the light guiding plate may be in contact with the top surface and the bottom surface of the light guiding plate. In this constitution, for example, the square inclined face may be formed, or, a plurality of the inclined faces may be formed at the one corner portion.

The above lighting unit may be used as a lighting unit for a liquid crystal display device comprising a liquid crystal panel disposed on a light emanating side of the lighting unit and having a pair of substrates with liquid crystal interposed therebetween. With this constitution, narrowing of the display panel frame of the liquid crystal display device can be achieved, and non-uniformity of the luminance of the liquid crystal display panel can be inhibited.

The object, as well as other objects, features and advantages of the present invention will become more apparent to those skilled in the art from the following detailed description of the preferred embodiments taken with reference to the accompanying drawings.

BRIEF DESCRIPTION OF THE DRAWINGS

FIG. 4 is a side view showing the light guiding plate of the lighting unit of FIG. 1 as viewed from a direction of an arrow a;

DETAILED DESCRIPTION OF THE PREFERRED EMBODIMENTS

Hereinbelow, embodiments of the present invention will be described with reference to the drawings.

(Embodiment 1)

Figure 1:
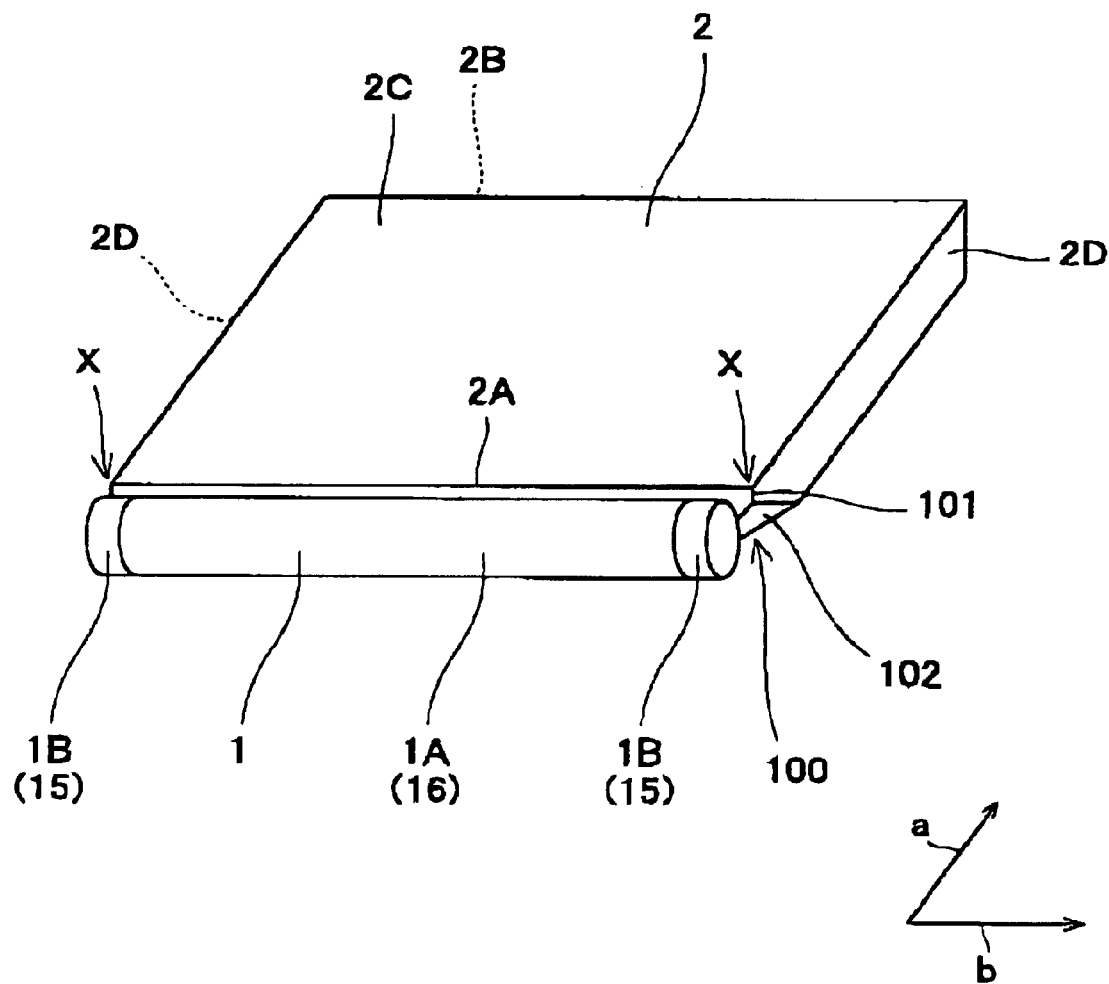
FIG. 1 is a perspective view schematically showing a constitution of main parts of a lighting unit according to an embodiment 1 of the present invention.
Figure 2:
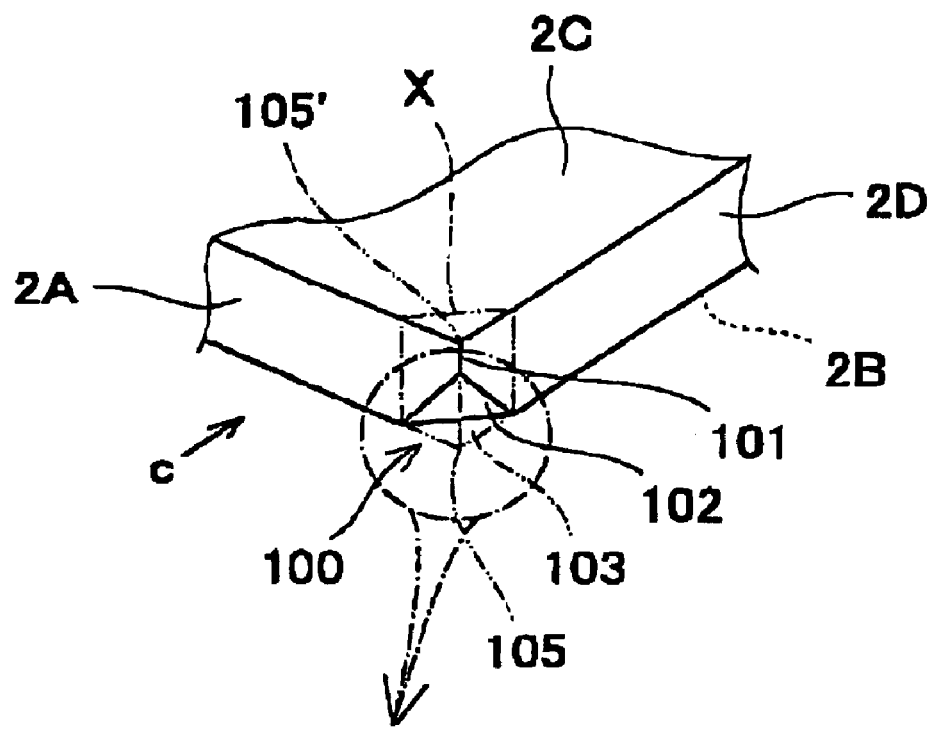
FIG. 2 is a partial perspective view schematically showing a constitution of a corner portion of a light guiding plate of the lighting unit of FIG. 1.
Figure 2:
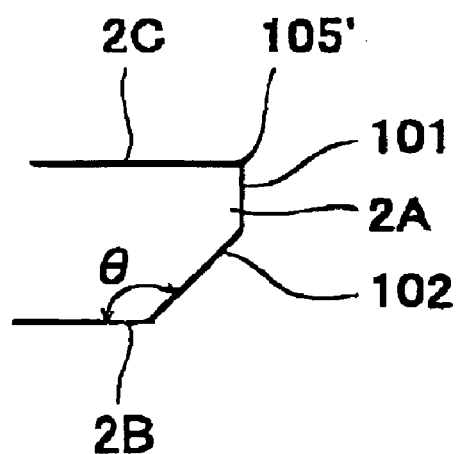
Figure 3:
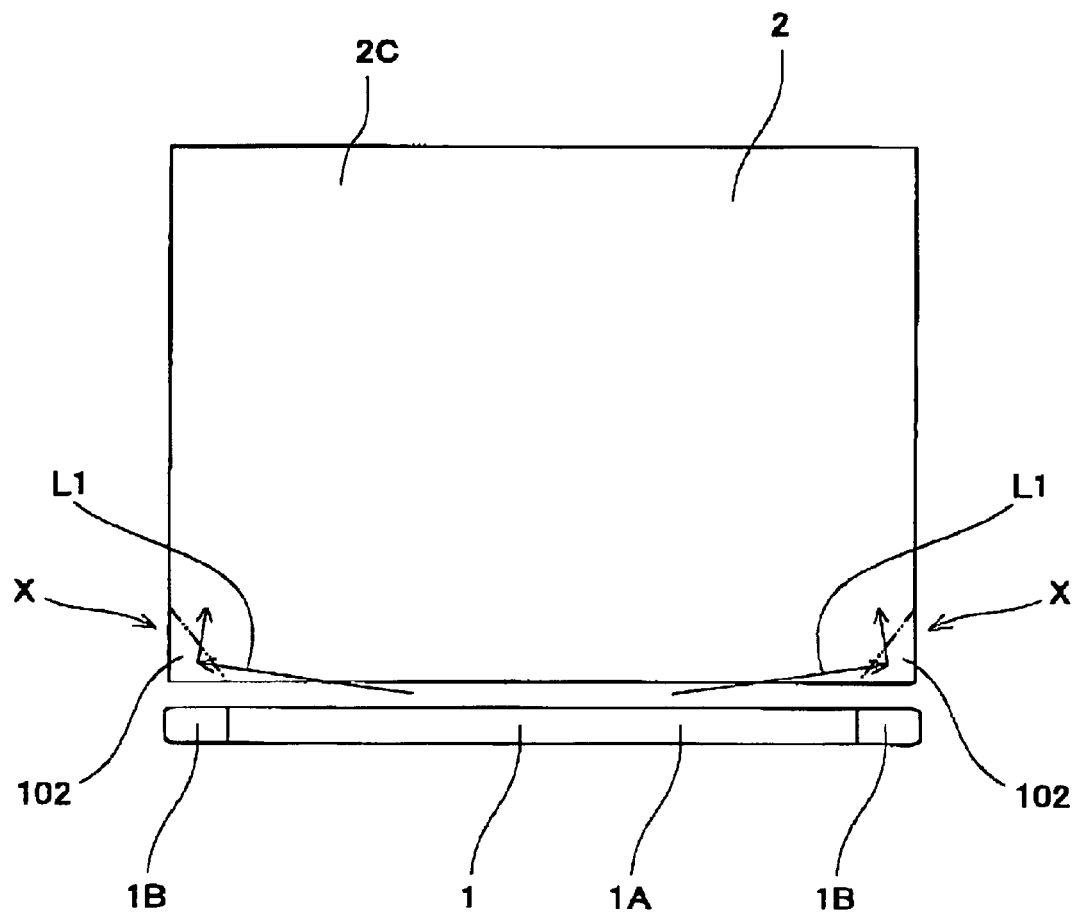
FIG. 3 is a top view schematically showing the lighting unit of FIG. 1.
Figure 4:
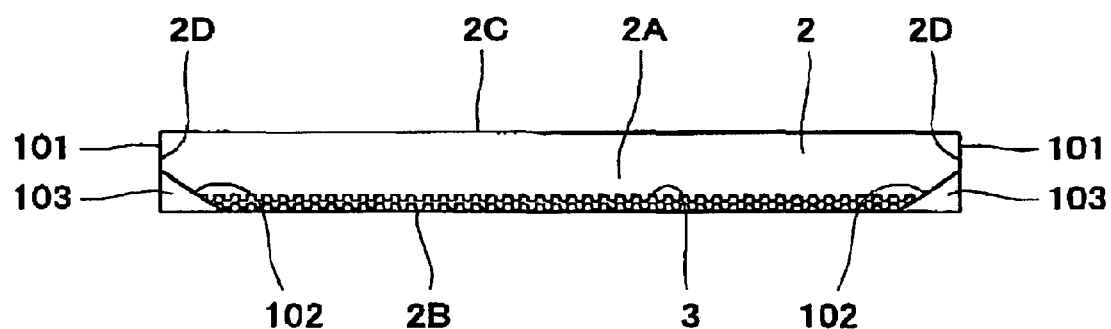
Figure 5:
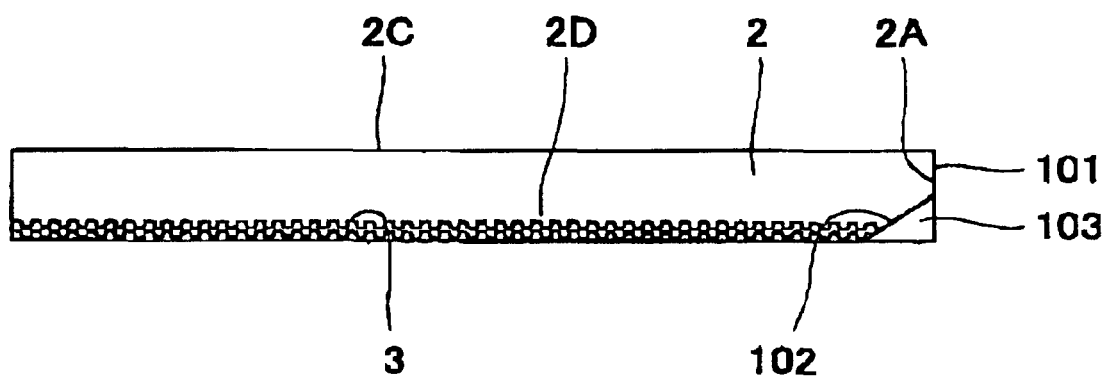
FIG. 5 is a side view showing the light guiding plate of the lighting unit of FIG. 1 as viewed from a direction of an arrow b.
Figure 6:
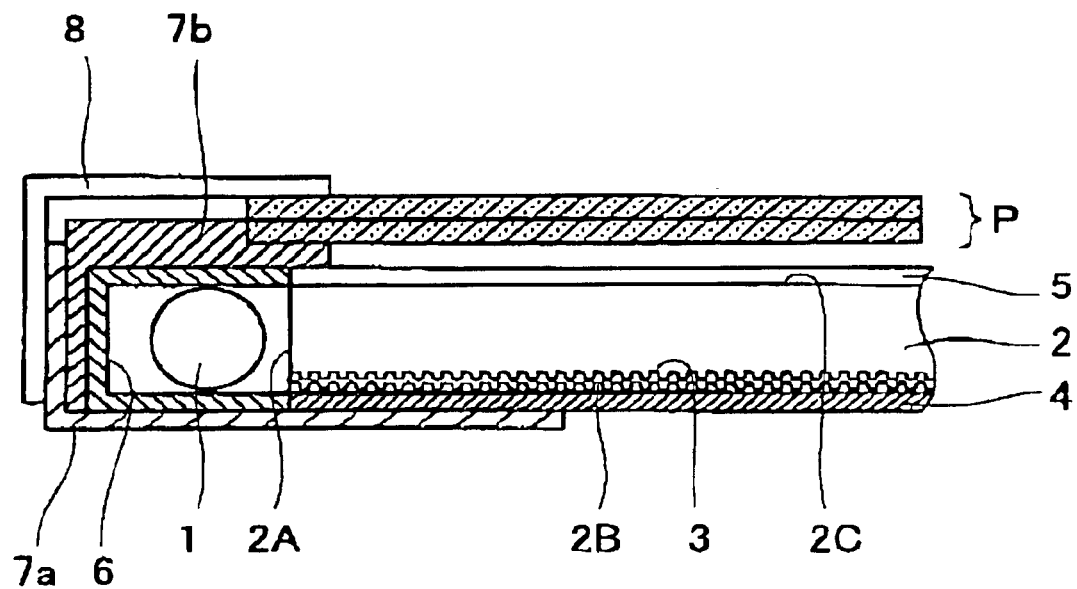
FIG. 6 is a sectional view schematically showing a constitution of a liquid crystal display device provided with the lighting unit of FIG. 1.

FIG. 1 is a perspective view schematically showing a constitution of main parts in a lighting unit according to an embodiment 1 of the present invention. FIG. 2 is a partial perspective view schematically showing a constitution of a corner portion of a light guiding plate of the lighting unit of FIG. 1. FIG. 3 is a top view schematically showing the lighting unit of FIG. 1. FIG. 4 is a side view showing the light guiding plate of the lighting unit of FIG. 1 as viewed from a direction of an arrow a. FIG. 5 is a side view showing the light guiding plate of the lighting unit of FIG. 1 as viewed from a direction of an arrow b. FIG. 6 is a sectional view schematically showing a constitution of a liquid crystal display device provided with the lighting unit of FIG. 1.

As shown in FIGS. 1 to 6, the lighting unit includes a bar-shaped light source 1, a light guiding plate 2 disposed such that the bar-shaped light source 1 is located close to a side surface (i.e., light incident face 2A) of the light guiding plate 2, a reflection sheet 4 disposed so as to cover at least a bottom surface 2B of the light guiding plate 2, a diffusion sheet 5 disposed on a top of a light emanating surface 2C of the light guiding plate 2 for adjusting light emanating characteristics, a reflector 6 covering the bar-shaped light source 1 so as to reflect light from the bar-shaped light source 1 toward the light guiding plate 2, and frames 7a, 7b for supporting these members 1, 2, 4, and 5.

A bar-shaped cold-cathode fluorescence tube or a hot-cathode fluorescence tube is used as the bar-shaped light source 1. Electrodes 15 are respectively disposed at both end portions of the bar-shaped light source 1. Since the electrodes 15 do not emit light by themselves, both end portions of the bar-shaped light source 1 where the electrodes 15 are respectively disposed become non-light-emitting portions 1B. And, a center portion (a portion of a glass tube 16) sandwiched between the non-light-emitting portions 1B at both end portions of the bar-shaped light source 1 serves as an effective light-emitting region (a light emitting portion) 1A. In such a constitution, in the bar-shaped light source 1, the length of the effective light-emitting region 1A in a direction of an arrow b is shorter than the overall length of the bar-shaped light source 1 in the same direction.

The light guiding plate 2 is made by molding polymethylmethacrylate (PMMA) in the form of a substantially rectangular-shaped plate and has a substantially rectangular top surface (light emanating surface) 2C and a bottom surface 2B which constitute a pair of principal surfaces and four side surfaces formed on outer peripheries of the principal surfaces. Scattering patterns 3 for scattering light are formed on the bottom surface 2B of the light guiding plate 2. And, the reflection sheet 4 is disposed along the bottom surface 2B so as to cover at least the bottom surface 2B. The bar-shaped light source 1 is disposed so as to be close to one side surface 2A of the four side surfaces. As a result, this side surface 2A becomes the light incident face of the light guiding plate 2, and light from the bar-shaped light source 1 is introduced from the light incident face 2A into the light guiding plate 2.

Here, to prevent the non-light-emitting portions 1B from protruding from the light guiding plate 2, the bar-shaped light source 1 is disposed so that both end portions of the light incident face 2A of the light guiding plate 2 respectively conform to outer end portions of the non-light-emitting portions 1B. Thereby, the non-light-emitting portions 1B of the bar-shaped light source 1 are disposed so as to be close to two corner portions X of the light guiding plate 2. AS shown in FIG. 2, here, each corner portion X refers to an imaginary triangular-prism shaped portion formed by intersecting of the light incident face 2A of the light guiding plate 2 and a side surface 2D adjacent to the light incident face 2A and includes a pair of apexes 105, 105'. At each corner portion X, a predetermined region including the apex 105 (more specifically, a triangular pyramid portion 103 to be described later) is cut out for chamfering, thereby forming a chamfered portion 100 including a cutout inclined face 102.

The chamfered portion 100 formed at each corner portion X is formed by cutting out a region of the corner portion X on the side of the bottom surface 2B along a plane intersecting a ridge line 101 formed by intersecting of the light incident face 2A and the side surface 2D adjacent thereto and inclined by an angle θ (90°<θ<180°) with respect to the bottom surface 2B so that the triangular pyramid portion 103 including the apex 105 is cut out from the corner portion X. As a result, this cut surface becomes a new surface of the chamfered portion 100 (i.e., the cutout inclined face) 102 (see FIG. 2 taken in the direction of an arrow c; the arrow c indicates a direction parallel to the cutout inclined face 102).

The cutout inclined face 102 thus formed is adjacent to the light incident face 2A, the side surface 2D, and the bottom surface 2B and is a triangular flat face inclined by an angle θ with respect to the bottom surface 2B. An inner surface of the cutout inclined face 102 may be flat or may have a light scattering structure for scattering light. The light scattering structure can be formed by forming a minute concave/convex pattern, for example, on the surface. With the cutout inclined face 102 having the light scattering structure, light coming from a variety of directions can be scattered on the surface 102, thereby enabling the light to be used more efficiently. Consequently, the dark portions can be eliminated as described later.

As shown in FIG. 6, in a liquid crystal display device provided with the lighting unit having the above constitution, a liquid crystal display panel P is disposed on the side of the light emanating face 2C of the lighting unit and a frame 8 is mounted on the liquid crystal display panel P from above, thereby constituting the device. Although its figures and detail descriptions are omitted, the liquid crystal display panel P, used to display characters and video images, includes a pair of transparent substrates having electrodes for display provided on their internal faces, between which liquid crystal material is filled. A plurality of driving circuits for displaying an image and the like on the liquid crystal display panel P and a substrate provided with controlling circuits are disposed around the liquid crystal display panel P.

Hereinbelow, operations of the lighting unit having the above constitution and the liquid crystal display device provided with the lighting unit will be described.

As shown in FIG. 3, light L1 emitted from the bar-shaped light source 1 is reflected by the reflector 6 (FIG. 6) and incident on the inside of the light guiding plate 2 through the light incident face 2A thereof. While traveling inside the light guiding plate 2, the light L1 is then scattered and reflected by the scattering patterns 3 and by the reflection sheet 4 (FIG. 6) appropriately and emanating through the light emanating surface 2C of the light guiding plate 2.

Here, the light L1 traveling inside the light guiding plate 2 reaches the cutout inclined face 102 of the chamfered portion 100 formed at each corner portion X. Then, the light L1 is reflected by the cutout inclined face 102, so that the light L1 is led to the light emanating surface 2C. For example, the light L1 emitted from the effective light-emitting region 1A of the bar-shaped light source 1 obliquely travels and reaches the chamfered portion 100 formed at each corner portion X and reflected by the cutout inclined face 102. Thereafter, the light L1 reflected by the cutout inclined face 102 is led to the side of the light emanating surface 2C. As a result, in the corner portion X where the non-light-emitting portion 1B of the bar-shaped light source 1 is disposed and in the vicinity thereof, the luminance is increased and thereby the dark portion is eliminated.

As described above, in the lighting unit thus constituted, the dark portions are inhibited from being generated at the corner portions X close to the non-light-emitting portions 1B of the bar-shaped light source 1, by a simple method in which the triangular pyramid portions 103 are cut out from the corner portions X to form the chamfered portions 100. Consequently, uniform luminance throughout the light emanating surface 2C of the light guiding plate 2 can be achieved. Also, in this case, the dark portions can be eliminated without increasing the overall length of the bar-shaped light source 1, and hence it is possible to achieve not only uniform luminance but also narrowing of the display panel frame, which are required in the liquid crystal display devices. Furthermore, since the cutout inclined face 102 is flat, its fabrication is easy.

In the liquid crystal display device provided with the above-described lighting unit, non-uniformity of the luminance of the liquid crystal display panel P can be inhibited, thereby making it possible to improve its display characteristics. Such a liquid crystal display device is suitable for use as a thin display device used in a notebook personal computer, a word processor, and a liquid crystal television, for example.

(Embodiment 2)

Figure 7:
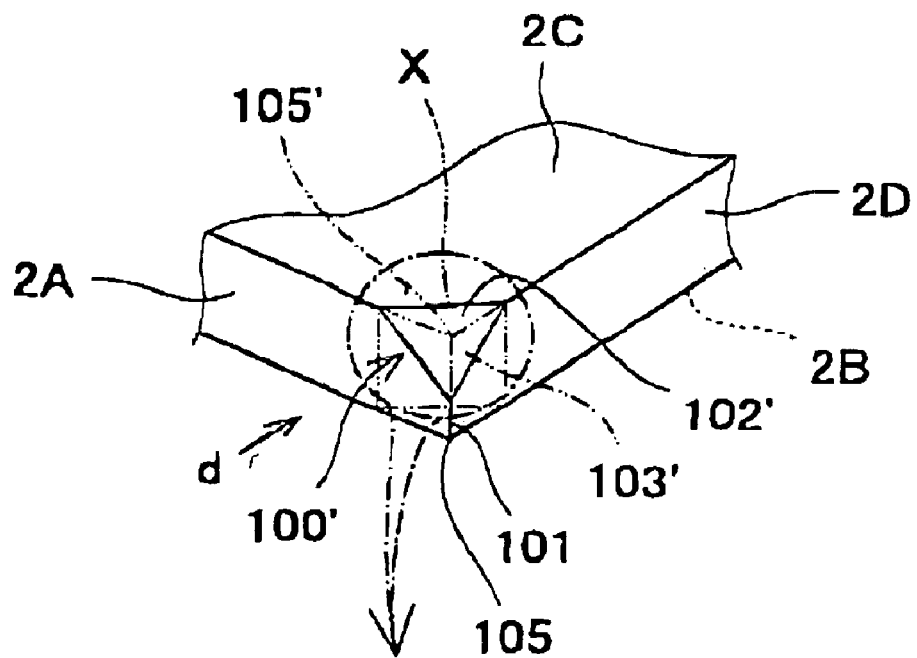
FIG. 7 is a partial perspective view schematically showing a constitution of a corner portion of a light guiding plate according to an embodiment 2 of the present invention.
Figure 7:
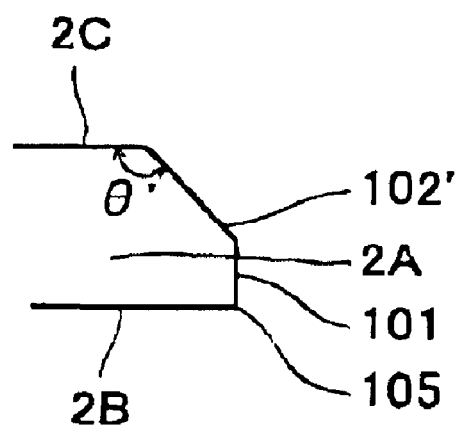

FIG. 7 is a partial perspective view schematically showing a constitution of a corner portion of a light guiding plate of a lighting unit according to an embodiment 2 of the present invention. The lighting unit of the present embodiment is identical in constitution to the lighting unit of the embodiment 1 except that the constitution of the corner portion X of the light guiding plate 2 is different from that of the embodiment 1. Although only one corner portion X of the light guiding plate 2 is shown in FIG. 7, the other corner portion X has the same constitution as this, similarly to the embodiment 1.

In the present embodiment, a chamfered portion 100' of the corner portion X is formed by cutting out a region of the corner portion X of the light guiding plate 2 on the side of the light emanating surface 2C along a plane intersecting the ridge line 101 and inclined by an angle θ' (90°<θ'<180°) with respect to the light emanating surface 2C so that a triangular pyramid portion 103' including an apex 105' is cut out from the corner portion X. As a result, this cut surface becomes a cutout inclined face 102' of the chamfered portion 100' (see FIG. 7 taken in the direction of an arrow d; the arrow d indicates a direction parallel to the cutout inclined face 102).

The cutout inclined face 102' thus formed is adjacent to the light incident face 2A, the side surface 2D, and the light emanating surface 2C and is a triangular flat face inclined by the angle θ' with respect to the light emanating surface 2C. An inner surface of the cutout inclined face 102' may be flat or may have a light scattering structure for scattering light.

In the lighting unit provided with the light guiding plate 2 thus constituted, light reflected by the cutout inclined face 102' travels toward the bottom surface 2B. Since the reflection sheet 4 is disposed along the bottom surface 2B, the light is reflected by the reflection sheet 4. As a result, the light reflected is led to the light emanating surface 2C. With the cutout inclined face 102' of the chamfered portion 100', the same effects as in the embodiment 1 can be obtained in the present embodiment.

While in the embodiments 1, 2 described above, the cases where the triangular pyramid portions 103, 103' including a part of the ridge line 101 are cut out from the corner portion X of the light guiding plate 2 are described, a triangular pyramid portion including the entire ridge line 101 (i.e., including both apexes 105, 105' of the corner portion X) may be cut out.

Figure 8:
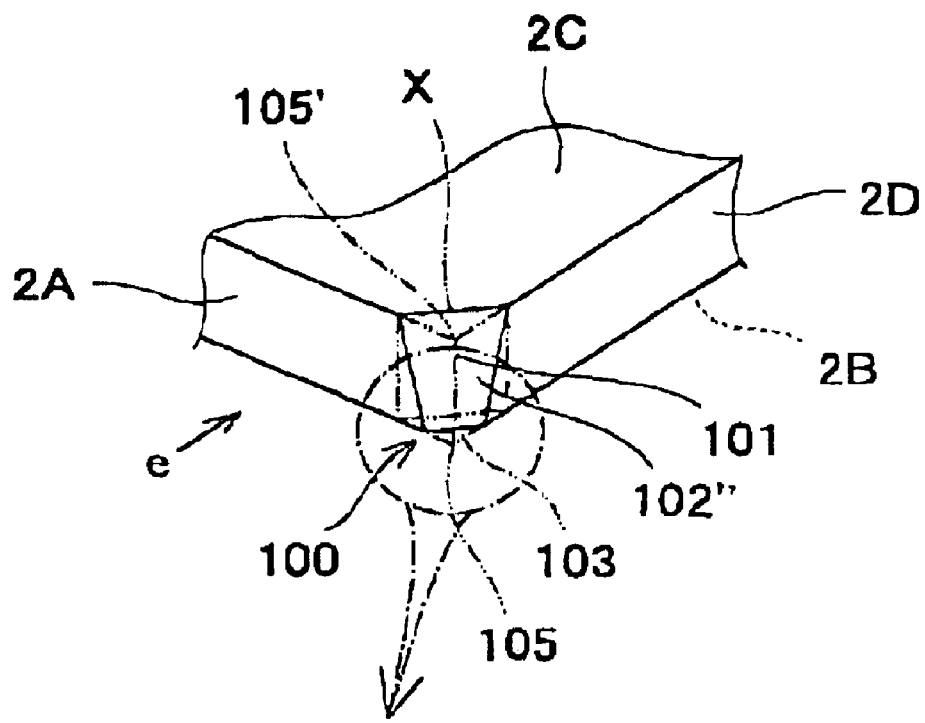
FIG. 8 is a partial perspective view schematically showing a constitution of a corner portion of a light guiding plate according to another embodiment of the present invention.
Figure 8:
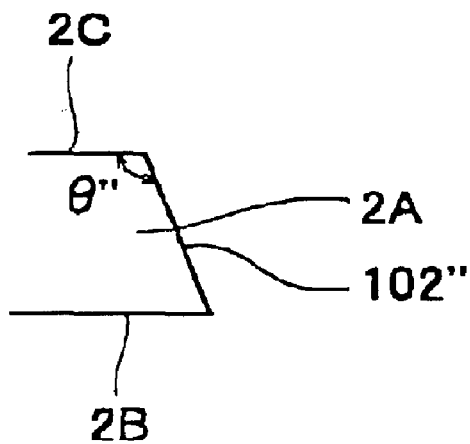

Furthermore, while in the embodiments 1, 2 described above, the cases where the triangular pyramid portions 103, 103' are cut out from the corner portion X to form the triangular cutout inclined face 102, 102' at the chamfered portions 100, 100' are described, the shape of the cutout portions is not limited to be triangular pyramidal and the shape of the cutout inclined faces formed at the chamfered portions is not limited to be triangular. Concretely, for example, as shown in FIG. 8, a cutout inclined face 102", which is adjacent to the light incident face 2A, the side surface 2D, the light emanating surface 2C, and the bottom surface 2B, and is square face, may be formed at the corner portion X of the light guiding plate 2. The cutout inclined face 102" is inclined by an angle θ" (90°<θ"<180°) with respect to the light emanating surface 2C.

Figure 9:
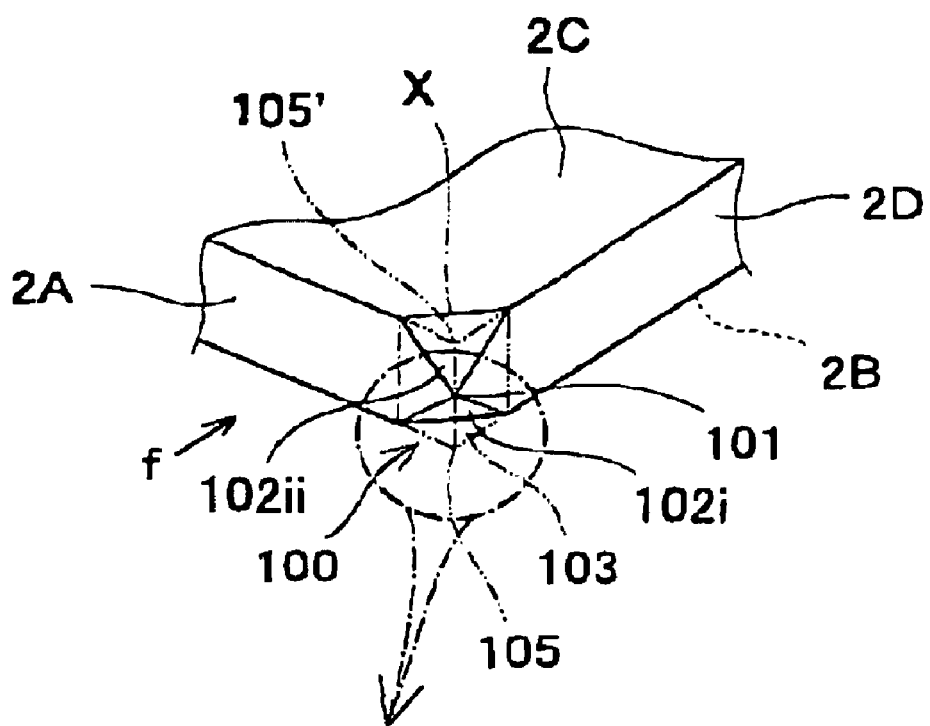
FIG. 9 is a partial perspective view schematically showing a constitution of a corner portion of a light guiding plate according to another embodiment of the present invention.
Figure 9:
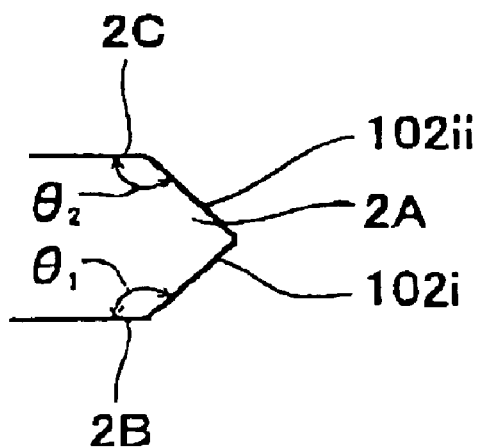
Figure 10:
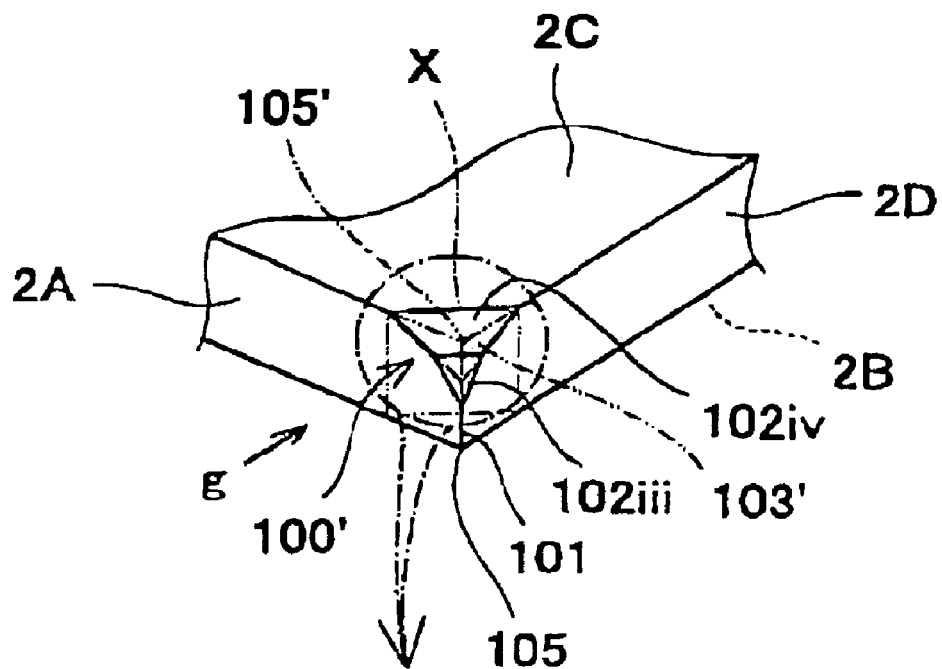
FIG. 10 is a partial perspective view schematically showing a constitution of a corner portion of a light guiding plate according to another embodiment of the present invention.
Figure 10:
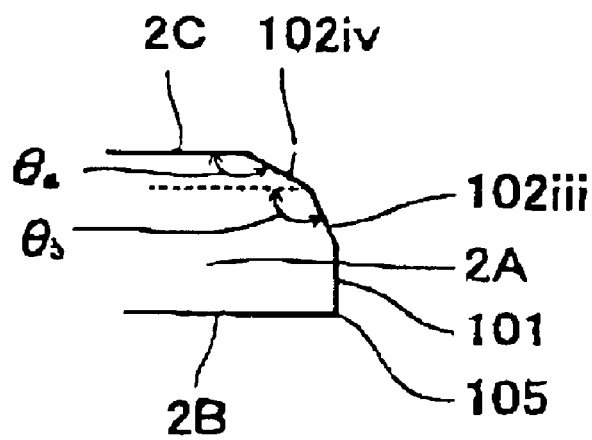
Figure 11:
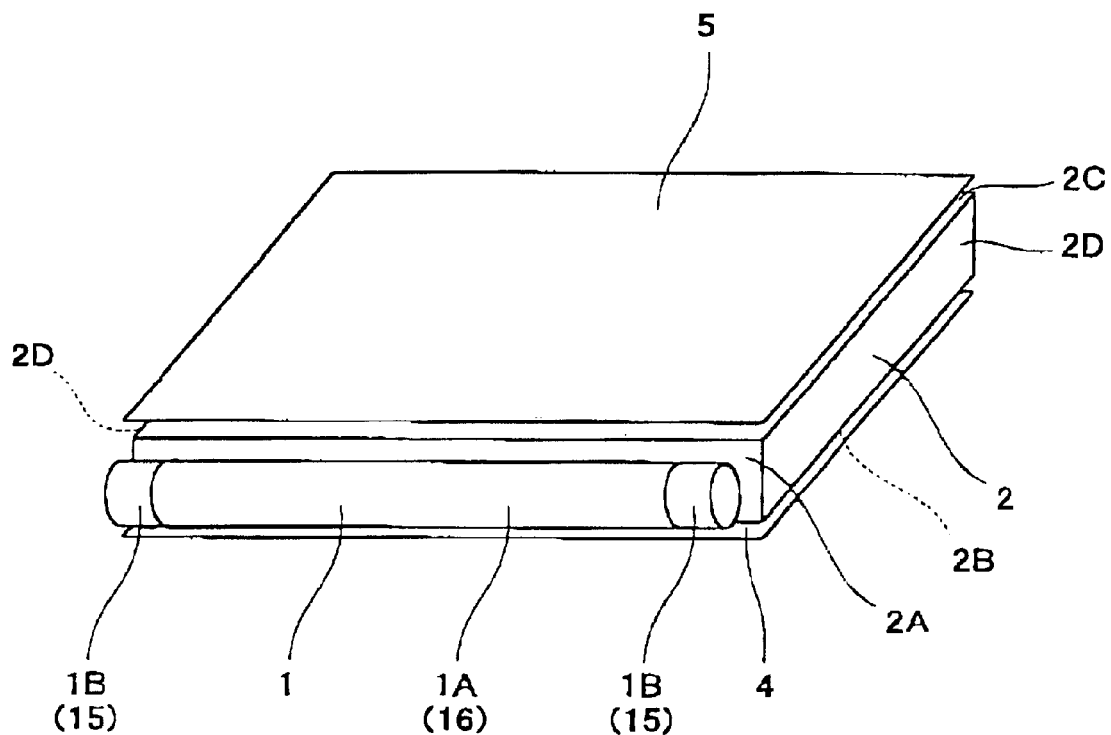
FIG. 11 is a perspective view schematically showing a constitution of main parts of a conventional lighting unit.
Figure 12:
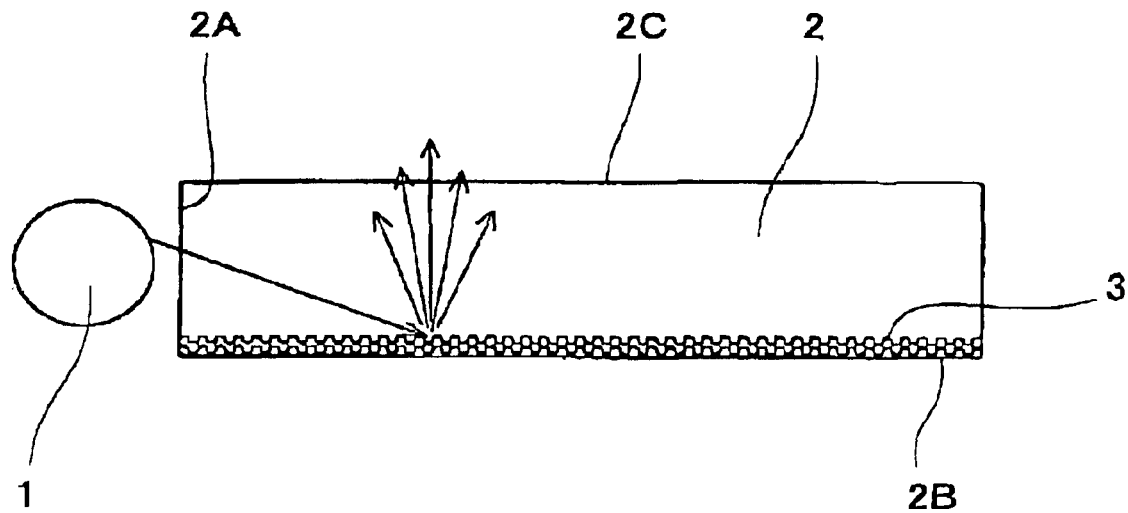
FIG. 12 is a sectional view schematically showing a lighting operation of the lighting unit of FIG. 11.
Figure 13:
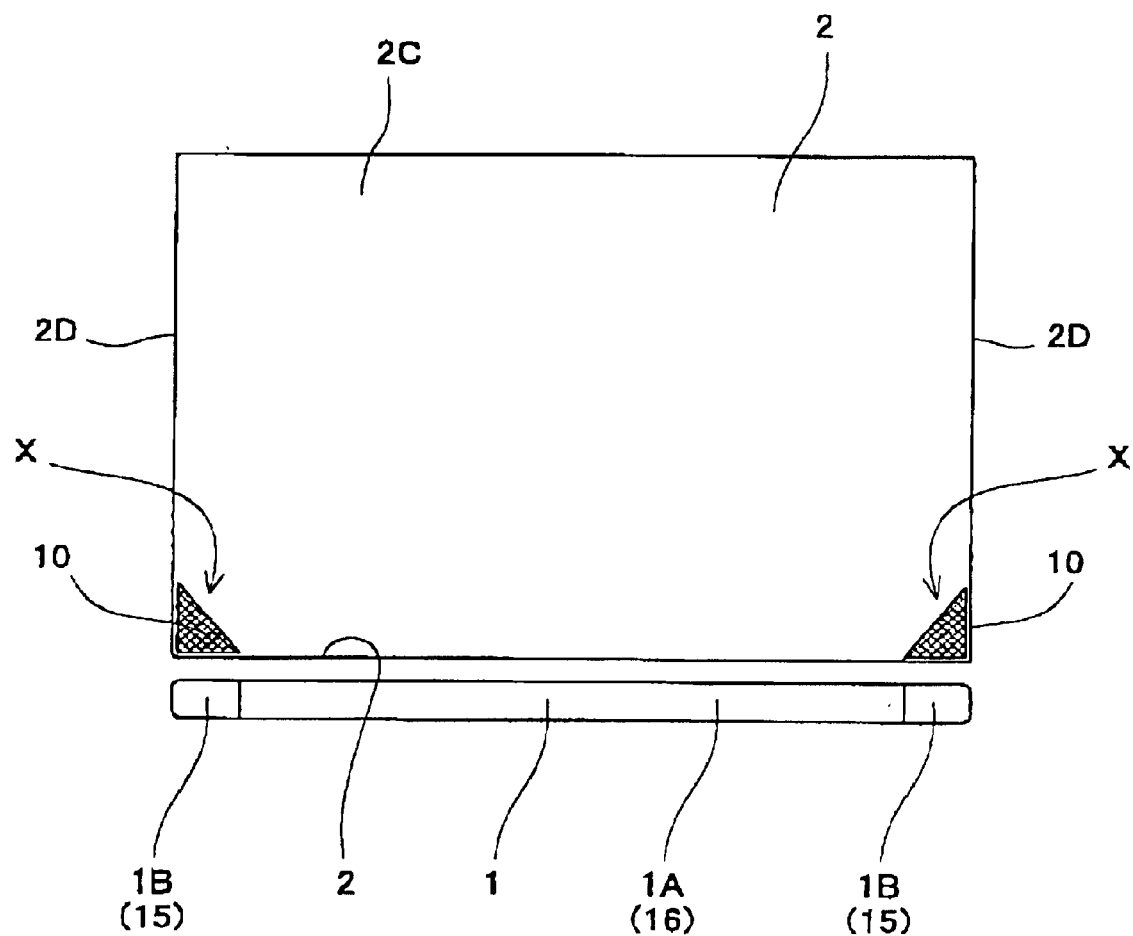
FIG. 13 is a top view schematically showing the lighting unit of FIG. 11.

Furthermore, a plurality of cutout inclined faces may be formed at one corner potion. For example, as shown in FIG. 9, a cutout inclined face 102$i$, inclined by an angle θ1 (90°<θ1<180°) with respect to the bottom surface 2B, and a cutout inclined face 102$ii$, inclined by an angle θ2 (90°<θ2<180°) with respect to the light emanating surface 2C may be formed at the corner portion X. Alternatively, as shown in FIG. 10, a cutout inclined face 102$iii$, inclined by an angle θ3 (90°<θ3<180°) with respect to the light emanating surface 2C, and a cutout inclined face 102$iv$, inclined by an angle θ4 (90°<θ4<180°) with respect to the light emanating surface 2C may be formed at the corner portion X. In this case, for example, the cutout inclined face 102$iv$ may be formed by cutting out a predetermined region from a region on the side of the light emanating surface 2C of the corner potion X, after that, the cutout inclined face 102$iii$ may be formed by further cutting out a predetermined region including a part of the cutout inclined face 102$iv$.]

Furthermore, while in the embodiments 1, 2 described above, the cutout inclined face is formed by cutting out the predetermined region from the corner portion of the light guiding plate, the cutout inclined face at the corner portion of the light guiding plate-may be formed by molding the light guiding plate with using a mold having cut out corner portion.

Furthermore, while in the embodiments 1, 2 described above, the cases where the chamfered portions are provided respectively at the pair of corner portions that correspond to the pair of non-light-emitting portions of the bar-shaped light source are described, the chamfered portion may be provide only at either one of the pair of corner portions. Furthermore, while in the embodiments 1, 2 described above, the cases where the light sources are bar-shaped are described, the shape of the light source is not limited to be bar shape, but other shapes may be adopted. For example, in the case where an L-shaped light source is used, the L-shaped light source is disposed so as to comply in shape with two adjacent side surfaces of the light guiding plate, and non-light-emitting portions are disposed respectively at two corner portions on a diagonal line of the light guiding plate. In this case, thus, a chamfered portion is formed in at least one of these two corner portions located on the diagonal line. Alternatively, as another example, two bar-shaped light sources may be disposed respectively along two opposing side surfaces of the light guiding plate. In this case, non-light-emitting portions of the bar-shaped light sources are disposed so as to be close to four corner portions of the light guiding plate. In this case, thus, a chamfered portion is formed in at least one of these four corner portions.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A lighting unit comprising:
   a light guiding plate having a top surface and a bottom surface as a pair of principal surfaces, a plurality of side surfaces formed on outer peripheries of the principal surfaces, and plurality of corner portions each of which is formed by intersecting adjacent two side surfaces of the plurality of side surfaces, the side surface a pair of the corner portions forming a light incident face; and
   a light source provided along the light incident face of the light guiding plate, the light source having both end portions forming non-light-emitting portions and a portion between the both end portions forming a light-emitting portion, respectively,
   in which light emitted from the light source and incident on the light incident face of the light guiding plate emanates from the top surface of the light guiding plate, wherein
   the light source is disposed such that the non-light-emitting portions correspond to the pair of the corner portions, respectively; and
   at least one of the pair of corner portions of the light guiding plate has an inclined face formed so as to intersect the light incident face, the side surface adjacent to the light incident face, and the top surface, and to face obliquely upward.

2. The lighting unit according to claim 1, wherein the inclined face of the light guiding plate has a light scattering strut for scattering light incident on the inclined face.

3. The lighting unit according to claim 1, wherein the inclined face of the light guiding plate is formed to further intersect the bottom surface of the light guiding plate.

4. The lighting unit according to claim 1, wherein the inclined face is bent so as to have a bent line extending in a horizontal direction, and each portion of the inclined face obtained by dividing the inclined face by the bend line is formed so as to face obliquely upward.

5. A liquid crystal display device comprising:

a lighting unit; and a liquid crystal panel disposed on a light emanating side of the lighting unit and having a pair of substrates with liquid crystal interposed therebetween, the lighting unit including:

a light guiding plate having a top surface and a bottom surface as a pair of principal surfaces, a plurality of side surfaces formed on outer peripheries of the principal surfaces, and a plurality of corner portions each of which is formed by intersecting adjacent two side surfaces of the plurality of side surfaces, the side surface between a pair of the corner portions forming a light incident face; and a light source provided along the light incident face of the light guiding plate the light source having both end portions forming non-light-emitting portions and a portion between the both end portions forming a light emitting portion, respectively;

in which light emitted from the light source and incident on the light incident face of the light guiding plate emanates from the top surface of the light guiding plate, wherein the light source is disposed such that the non-light emitting portions respond to the pair of the corner portions, respectively; and at least one of the pair of corner portions of the light guiding plate has an inclined face formed so as to intersect the light incident face, the side surface adjacent to the light incident face, and the top surface, and to face obliquely upward.

* * * * *

UNITED STATES PATENT AND TRADEMARK OFFICE
CERTIFICATE OF CORRECTION

PATENT NO. : 6,871,974 B2
DATED : March 29, 2005
INVENTOR(S) : Takafumi Kashiwagi et al.

It is certified that error appears in the above-identified patent and that said Letters Patent is hereby corrected as shown below:

<u>Title page, Item [54] and Column 1, lines 1 and 2,</u>
Title, change from "LIGHTING UNIT AND LIQUID CRYSTAL DEVICE USING THE SAME" to -- LIGHTING UNIT AND LIQUID CRYSTAL DISPLAY DEVICE USING THE SAME --;

<u>Column 8,</u>
Line 36, change "and plurality of corner" to -- and a plurality of corner --;
Line 38, change "the side surface a pair of" to -- the side surface between a pair of --;
Line 59, change "strut" to -- structure --;

<u>Column 10,</u>
Line 9, change "respond" to -- correspond --.

Signed and Sealed this

Sixteenth Day of August, 2005

JON W. DUDAS
*Director of the United States Patent and Trademark Office*